Figure 2:
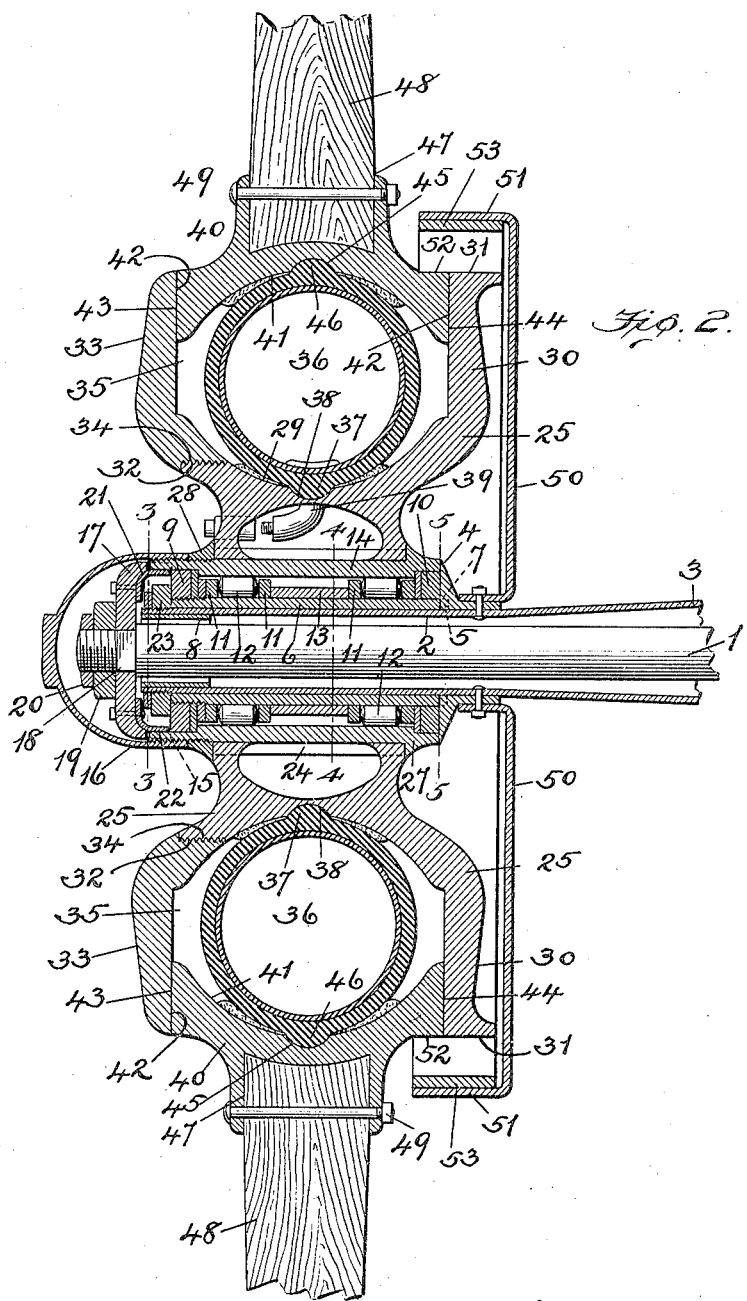

S. C. HATFIELD.
WHEEL FOR VEHICLES.
APPLICATION FILED JULY 11, 1911.
1,087,903.
Patented Feb. 17, 1914.
2 SHEETS—SHEET 1.
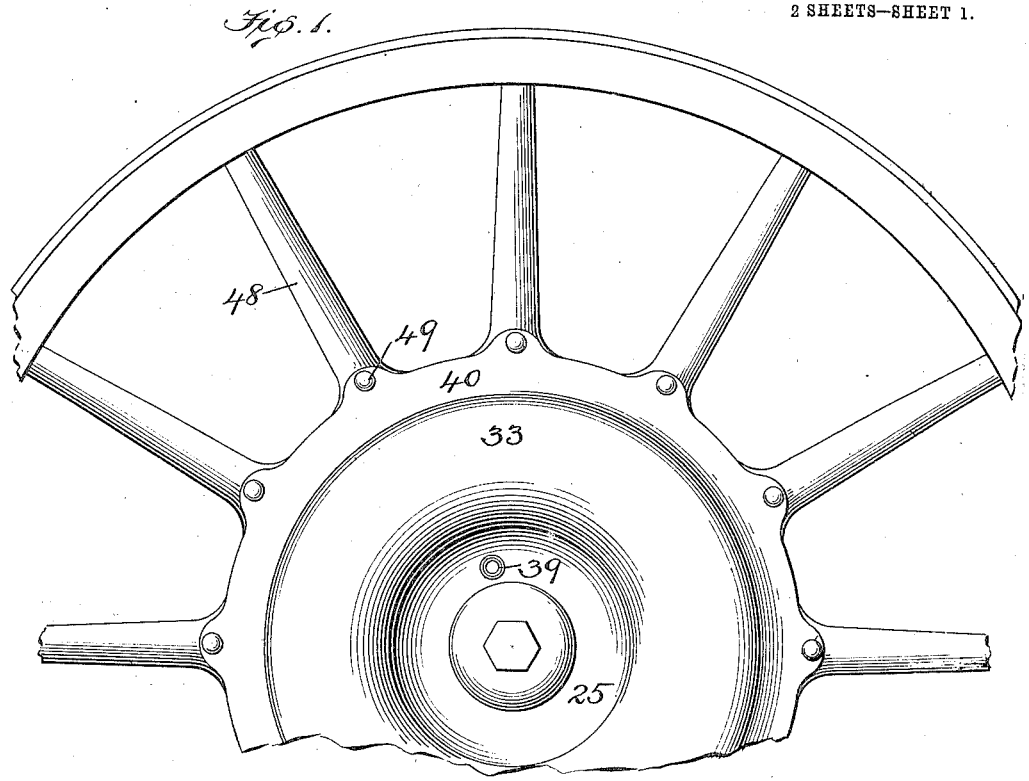
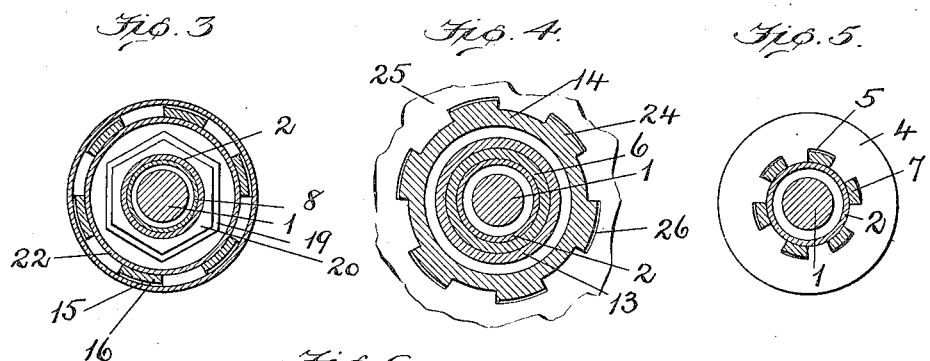
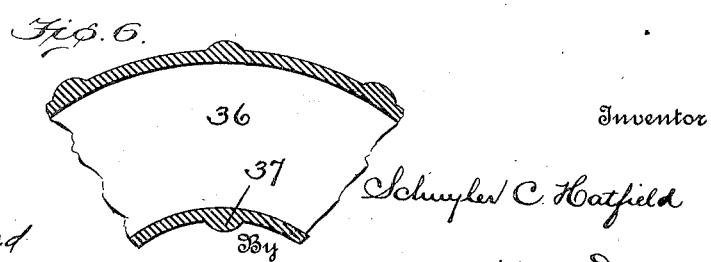
Witnesses
Edwin L. Bradford
G. Ferd. Vogt
Inventor
Schuyler C. Hatfield
By
Mann & Co.
Attorneys

S. C. HATFIELD.
WHEEL FOR VEHICLES.
APPLICATION FILED JULY 11, 1911.

1,087,903.

Patented Feb. 17, 1914.
2 SHEETS—SHEET 2.

Witnesses
Edwin L. Bradford
G. Ferd. Vogt

Inventor
Schuyler C. Hatfield
By
Mann & Co.
Attorneys

UNITED STATES PATENT OFFICE.

SCHUYLER C. HATFIELD, OF BALTIMORE, MARYLAND, ASSIGNOR, BY DIRECT AND MESNE ASSIGNMENTS, TO THE ELASTIC WHEEL COMPANY, OF BALTIMORE, MARYLAND, A CORPORATION OF DELAWARE.

WHEEL FOR VEHICLES.

1,087,903. Specification of Letters Patent. Patented Feb. 17, 1914.

Application filed July 11, 1911. Serial No. 637,921.

*To all whom it may concern:*

Be it known that I, SCHUYLER C. HATFIELD, a citizen of the United States, residing at Baltimore, in the State of Maryland, have invented certain new and useful Improvements in Wheels for Vehicles, of which the following is a specification.

This invention relates to improvements in wheels for vehicles and especially to that class of wheels wherein a cushioning means is interposed between the rim and hub.

One object of the invention is to provide an improved construction and arrangement of cushion about the hub whereby to render the cushion accessible; to eliminate the friction between the driver and driven parts of the wheel and to enable both of said parts to be acted upon during the operation of applying the braking power whereby to relieve the cushioning device of undue strains.

With these and other objects in view the accompanying drawings illustrate the invention wherein, Figure 1, is a side elevation of the upper portion of a wheel to which the invention is applied. Fig. 2, is an enlarged vertical section through the hub and the adjacent parts of the wheel showing the application of the invention. Fig. 3, is a vertical cross-section through the outer end of the hub,—the section being taken on the line 3—3 of Fig. 2. Fig. 4, is a similar section through the center of the hub,—this section being taken on the line 4—4 of Fig. 2. Fig. 5, is a vertical section through the inner end of the hub and this section is taken on the line 5—5 of Fig. 2, and Fig. 6, is a section through a portion of the cushion tube showing the circumferential projections thereon to prevent the tube from turning.

Referring to the drawings the numeral, 1, designates the axle shaft and, 2, the sleeve portion at the outer end of the casing, 3, that incloses the axle shaft which is well known in the art.

The sleeve, 2, carries a rigid collar, 4, at the inner side of the wheel which collar is provided with a series of sockets, 5, and a bearing sleeve, 6, slips over the outer end of the sleeve, 2, and has a plurality of projecting lugs, 7, at its inner end which enter the sockets, 5, in the collar and thus lock the bearing sleeve against rotation. A reinforce collar, 8, is provided on the interior and at the end of the sleeve, 2, whereby to resist strains that would tend to crush said sleeve end. Collars, 9, and 10, respectively are provided at opposite ends of the bearing sleeve, 6, and between said collars and also encircling the bearing sleeve are a plurality of bearing collars 11, which are so spaced as to form annular channels for the reception of suitable rollers, 12. A spacing collar, 13, also encircling the bearing sleeve, 6, serves to separate the two inner bearing collars, 11.

The hub proper comprises an annular shell, 14, which encircles the rollers, 12, and also the collars, 9, and 10, and has its inner end confronting the rigid collar, 4, on the casing while its outer end has a series of edge notches, 15, which intermesh with like edge projections, 16, on a coupling member, 17. This coupling member has the form of a cap and fits over the outer end of the axle shaft, 1, with which it is rigidly secured by means of a squared or angular portion, 18, on the axle and a like-shaped opening in the cap. Nuts, 19, and 20, also lock the cap, coupling in place on the end of the axle shaft. A cup-shaped washer plate, 21, is placed on the inside of the cap coupling and has its flange portion, 22, projecting over the engaged edge notches, 15, and 16.

The lock collars, 23, encircle the outer end of the sleeve 2, and serve to hold the bearing sleeve, 6, in place.

The annular shell, 14, of the hub is provided with a plurality of circumferential ribs, 24, which extend longitudinally of the shell and in a direction substantially parallel with the shaft, 1, for a purpose presently to be explained.

A metal body, 25, encircles the shell, 14, and has a circular horizontal bore through which the said shell extends. The circumference of the horizontal bore is provided with a plurality of recesses, 26, which are so distributed as to receive the horizontal ribs, 24, on the outer surface of the shell as shown in Fig. 4, and by this means the body and shell are rigidly locked to be rotated together. The inner end of the shell has an annular flange, 27, against which the inner end of the body is seated and a collar, 28, is provided at the outer end of the shell which forces the body against said annular flange.

The metal body, 25, has a concave circumferential face, 29, and an integrally-formed flange, 30, at one side which extends laterally and then outwardly from the said face, 29. The flange, 30, has position at the inner side of the wheel where it encircles the casing, 3, and is provided with a circular face, 31, for a purpose which will presently be explained. At the outer side, the body, 25, has an annular screw-threaded face, 32, which is of much smaller diameter than the flange, 30, at the inner side and in fact said face, 32, is very little larger in diameter than the concave face, 29, in order that ready access may be had to the interior of the body for purposes to be explained. A detachable ring flange, 33, is provided at the outer side of the body, 25, and has a central opening with a threaded face, 34, which engages the threads on the face, 32, of the head and by this means the ring flange, 33, at one side and the flange, 30, at the other side form an annular channel or chamber, 35, about the head and between the said flanges.

The chamber, 35, between the fixed and movable flanges accommodates the cushioning device, which in the present instance has the form of a pneumatic tube, 36. This tube is of a ring shape and is provided around the inner circumferential surface with a series of projections, 37, which seat in correspondingly-shaped recesses, 38, in the face, 29, of body, 25. An air supply connection, 39, is provided for the tube, 36, and is accessible from the outer side of the body. The construction of this connection is immaterial and is therefore not specifically described herein.

At the outer side or circumference of the tube, 36, there is provided an annular ring plate, 40, which has a concave circular inner face, 41, and vertical side faces, 42. The width of this ring plate is such that it will snugly fit the chamber, 35, so that its side faces, 42, will have frictional or close contact with the inner vertical faces, 43, and 44, respectively of the movable ring flange, 33, and the rigid flange, 30, of the body. This ring plate has a series of recesses or cavities, 45, in its concave face, 41, which receive similarly-shaped projections 46, on the outer circumference of the tube, 36. By this means the tube will have a somewhat positive connection with the ring plate, 40, at the outer side while at the inner side the projections, 37, and cavities or recesses, 38, will perform a like function between the tube and the concave face of the body, thus avoiding undue friction on the tube. Spoke sockets, 47, are provided at the outer side of the ring plate, 40, in which the inner ends of the spokes, 48, are secured by means of suitable bolts, 49, that pass therethrough.

A suitable guard, 50 on the collar, 4, adjacent to the casing, 3, and said guard covers the inner side of the body flange, 30, and has a flange, 51, that turns outwardly over the face, 31, of said flange and also over a circular face, 52, on the ring plate, 40, as seen in Fig. 2.

The ordinary brake band, 53, encircles the face, 31, of flange, 30, and also encircles the face, 52, of the ring plate, 40, so that during the operation of braking, the band will simultaneously engage faces, 52, and 31, and thus apply the braking power to both the outer and the inner members of the wheel without requiring the tube, 36, to act by mere frictional force to effect the braking.

Having thus described my invention what I claim and desire to secure by Letters Patent is,—

1. In a vehicle wheel the combination with a central bearing sleeve, of roller bearing means about the sleeve; an annular shell around said bearing means and said shell being provided at its inner end with an annular flange; a metal body having a circular horizontal bore through which the annular shell projects with the annular flange on the shell seating against the inner side of the body,—said body having an enlarged annular flange formed integrally therewith at its inner side and at its outer side the body having a circular horizontal screw-threaded face; a ring plate at the outer side of the body and having a circular horizontal screw-threaded face to encircle and engage the threaded face on the outer side of the body; a pneumatic tube around the said body and an outer ring plate around the pneumatic tube and between the enlarged flange at the inner side of the body and the ring plate at the outer side of the body and said outer ring plate having spoke sockets.

2. In a vehicle wheel the combination with the axle casing, of a sleeve around the outer end of the casing; a collar rigid on said sleeve but spaced from the end thereof; a shell around the sleeve and having its inner end confronting the rigid collar on the sleeve and at its outer end provided with a series of edge notches; a coupling member having projections to enter the notches in the sleeve and also having means to engage the axle; a body having a central opening to receive the shell and provided with an annular channel; a pneumatic tube in said channel, and a ring plate around the outer circumference of the tube and having spoke sockets at its outer side.

In testimony whereof I affix my signature in presence of two witnesses.

SCHUYLER C. HATFIELD.

Witnesses:
   CHARLES B. MANN, Jr.,
   G. FERD. VOGT.